(12) United States Patent
Chivchyan et al.

(10) Patent No.: US 10,562,749 B2
(45) Date of Patent: Feb. 18, 2020

(54) BEVERAGE DISPENSING SYSTEM

(71) Applicants: Kachatur Chivchyan, Pasadena, CA (US); Andranik Chivchyan, Pasadena, CA (US)

(72) Inventors: Kachatur Chivchyan, Pasadena, CA (US); Andranik Chivchyan, Pasadena, CA (US)

( * ) Notice: Subject to any disclaimer, the term of this patent is extended or adjusted under 35 U.S.C. 154(b) by 205 days.

(21) Appl. No.: 15/635,917

(22) Filed: Jun. 28, 2017

(65) Prior Publication Data

US 2019/0002263 A1    Jan. 3, 2019

(51) Int. Cl.
| | |
|---|---|
| *B67D 1/08* | (2006.01) |
| *B67D 1/00* | (2006.01) |
| *B60N 3/10* | (2006.01) |
| *H02J 7/35* | (2006.01) |
| *H02S 40/38* | (2014.01) |
| *B67D 3/00* | (2006.01) |

(52) U.S. Cl.
CPC .......... *B67D 1/0004* (2013.01); *B60N 3/101* (2013.01); *B60N 3/104* (2013.01); *B67D 1/0857* (2013.01); *B67D 3/0009* (2013.01); *H02J 7/35* (2013.01); *H02S 40/38* (2014.12)

(58) Field of Classification Search
CPC .. B67D 1/0004; B67D 1/0857; B67D 3/0009; B60N 3/101; B60N 3/104; H02J 7/35; H02S 40/38
See application file for complete search history.

(56) References Cited

U.S. PATENT DOCUMENTS

| | | | | |
|---|---|---|---|---|
| 2,813,537 A | * | 11/1957 | Lind | B60N 3/18 137/353 |
| 2,830,613 A | * | 4/1958 | Mason | B60N 3/16 137/353 |
| 2,975,797 A | * | 3/1961 | Matheney | B60N 3/18 137/334 |
| 3,642,023 A | | 2/1972 | Rembert | |
| 3,858,405 A | * | 1/1975 | Manzke | B60H 1/00592 62/196.1 |
| 3,955,713 A | * | 5/1976 | Hurley | A47J 31/401 222/129.4 |
| 4,034,571 A | | 7/1977 | Bollinger | |
| 4,055,279 A | * | 10/1977 | Lapera | B60N 3/18 137/354 |
| 4,130,145 A | * | 12/1978 | Thomas, Jr. | B60N 3/18 141/360 |
| 4,140,150 A | | 2/1979 | Rundell | |

(Continued)

FOREIGN PATENT DOCUMENTS

ES    1993-288537    *    9/1993    ............. B60K 16/00

*Primary Examiner* — Nicolas A Arnett

(57) ABSTRACT

A beverage dispensing system for selectively dispensing a beverage in a vehicle includes a vehicle that has a cabin and an outer surface. A refrigerator is positioned within the vehicle and the refrigerator contains and cools a beverage. A dispensing unit is fluidly coupled to the refrigerator and the dispensing unit selectively dispenses the beverage. The dispensing unit is positioned within the cabin to be accessible to a driver of the vehicle. A charging unit is coupled to the vehicle thereby facilitating the charging to be exposed to sunlight. The charging unit converts sunlight into electrical energy and the charging unit is electrically coupled to the refrigerator and the dispensing unit.

10 Claims, 4 Drawing Sheets

(56) References Cited

U.S. PATENT DOCUMENTS

| | | | |
|---|---|---|---|
| 5,497,918 A | 3/1996 | Brilanchik | |
| 6,065,939 A | 5/2000 | Lin | |
| 6,076,706 A | 6/2000 | Kritchman | |
| 6,460,361 B1 | 10/2002 | Faria | |
| 7,108,094 B2 | 9/2006 | Daniels | |
| 8,152,023 B2* | 4/2012 | Hatuka | A47J 31/005 |
| | | | 221/96 |
| 8,322,574 B1 | 12/2012 | Phillips | |
| 8,708,197 B1* | 4/2014 | Brewer | B67D 1/0862 |
| | | | 222/113 |
| 8,820,593 B2 | 9/2014 | Pesach | |
| 9,517,923 B2* | 12/2016 | Al-Hakim | B67D 1/0894 |
| 2007/0131716 A1* | 6/2007 | Prabucki | B67D 1/0869 |
| | | | 222/146.6 |
| 2009/0078724 A1* | 3/2009 | Lamb | B60P 3/0257 |
| | | | 222/608 |
| 2015/0232112 A1* | 8/2015 | Cates | B62B 3/02 |
| | | | 180/9 |
| 2016/0096716 A1* | 4/2016 | Al-Hakim | B67D 1/0894 |
| | | | 141/113 |

\* cited by examiner

BEVERAGE DISPENSING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to dispensing devices and more particularly pertains to a new dispensing device for selectively dispensing a beverage in a vehicle.

BRIEF SUMMARY OF THE INVENTION

An embodiment of the disclosure meets the needs presented above by generally comprising a vehicle that has a cabin and an outer surface. A refrigerator is positioned within the vehicle and the refrigerator contains and cools a beverage. A dispensing unit is fluidly coupled to the refrigerator and the dispensing unit selectively dispenses the beverage. The dispensing unit is positioned within the cabin to be accessible to a driver of the vehicle. A charging unit is coupled to the vehicle thereby facilitating the charging to be exposed to sunlight. The charging unit converts sunlight into electrical energy and the charging unit is electrically coupled to the refrigerator and the dispensing unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
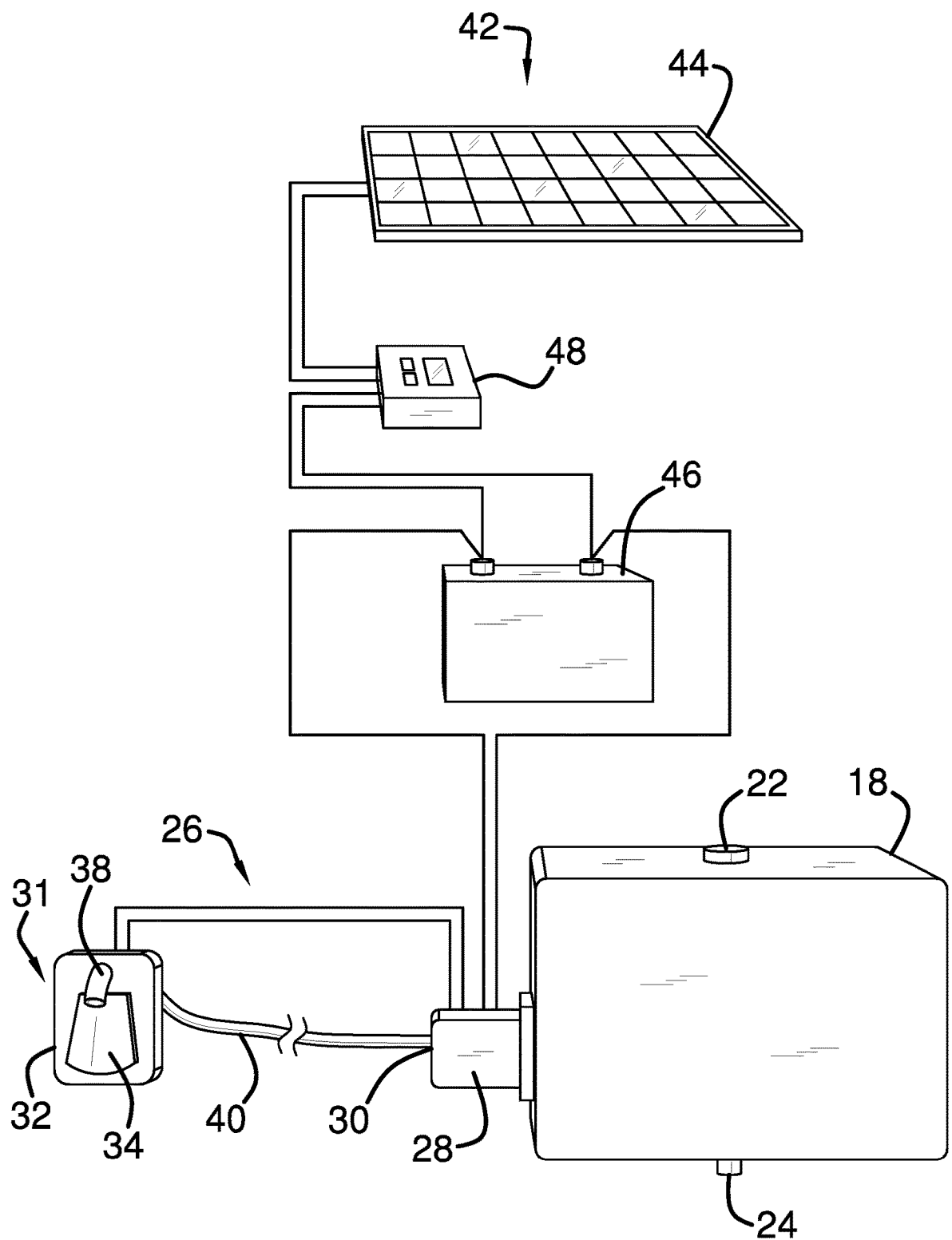
FIG. 1 is a perspective view of refrigerator, a dispensing unit and a charging unit of a beverage dispensing system according to an embodiment of the disclosure.
Figure 2:
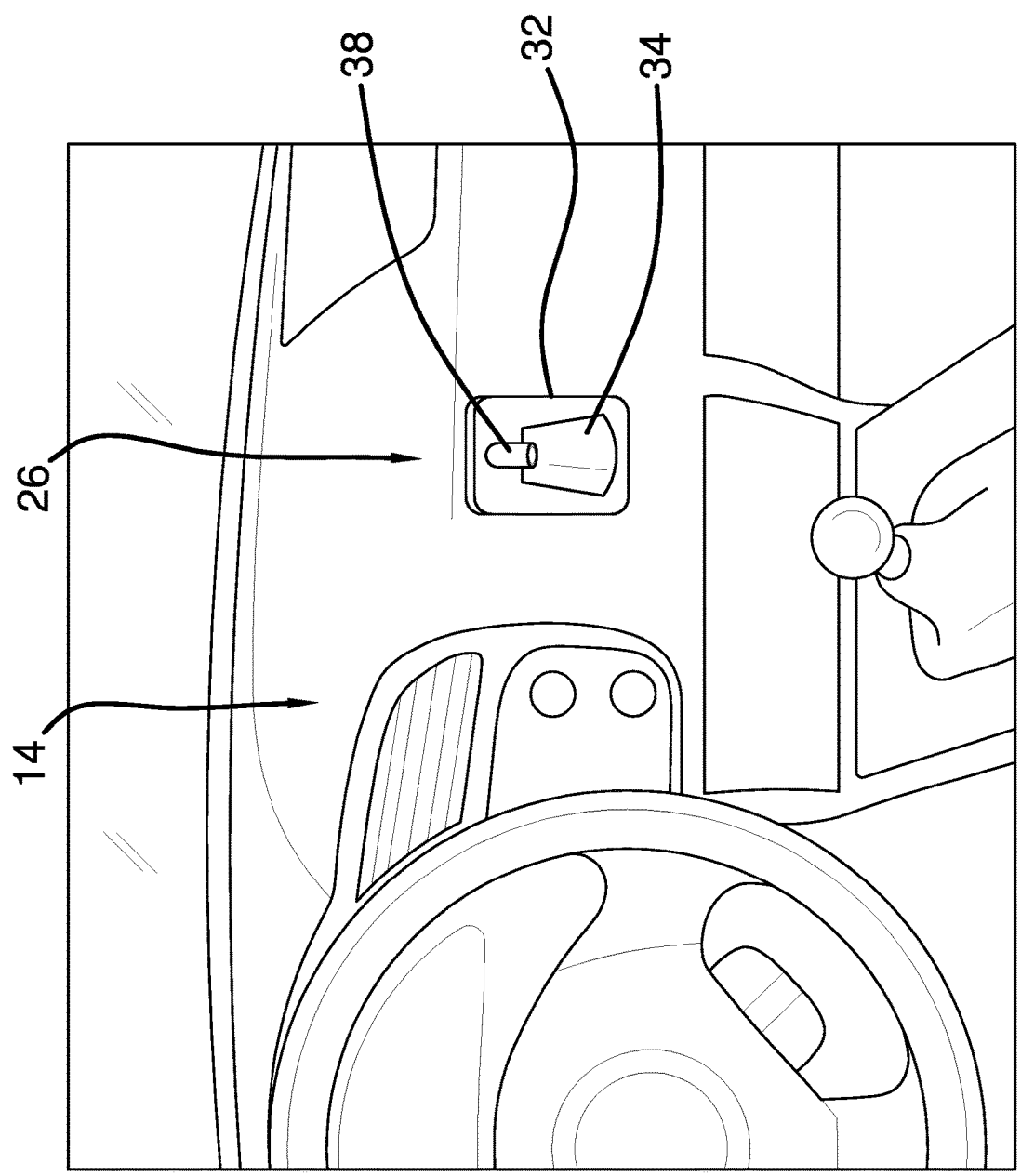
FIG. 2 is a perspective view of a cabin of a vehicle of an embodiment of the disclosure.
Figure 3:
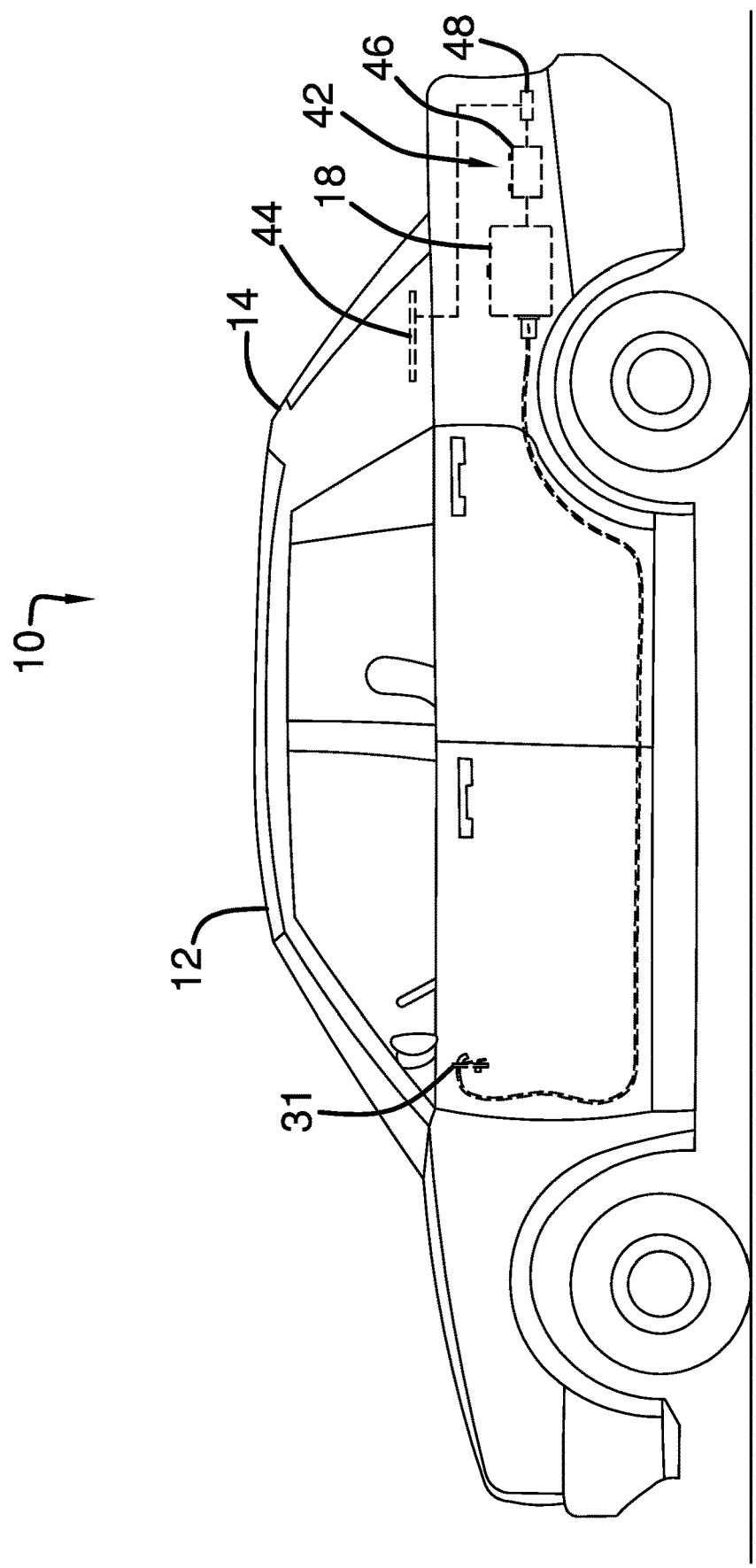
FIG. 3 is a phantom perspective view of an embodiment of the disclosure.
Figure 4:
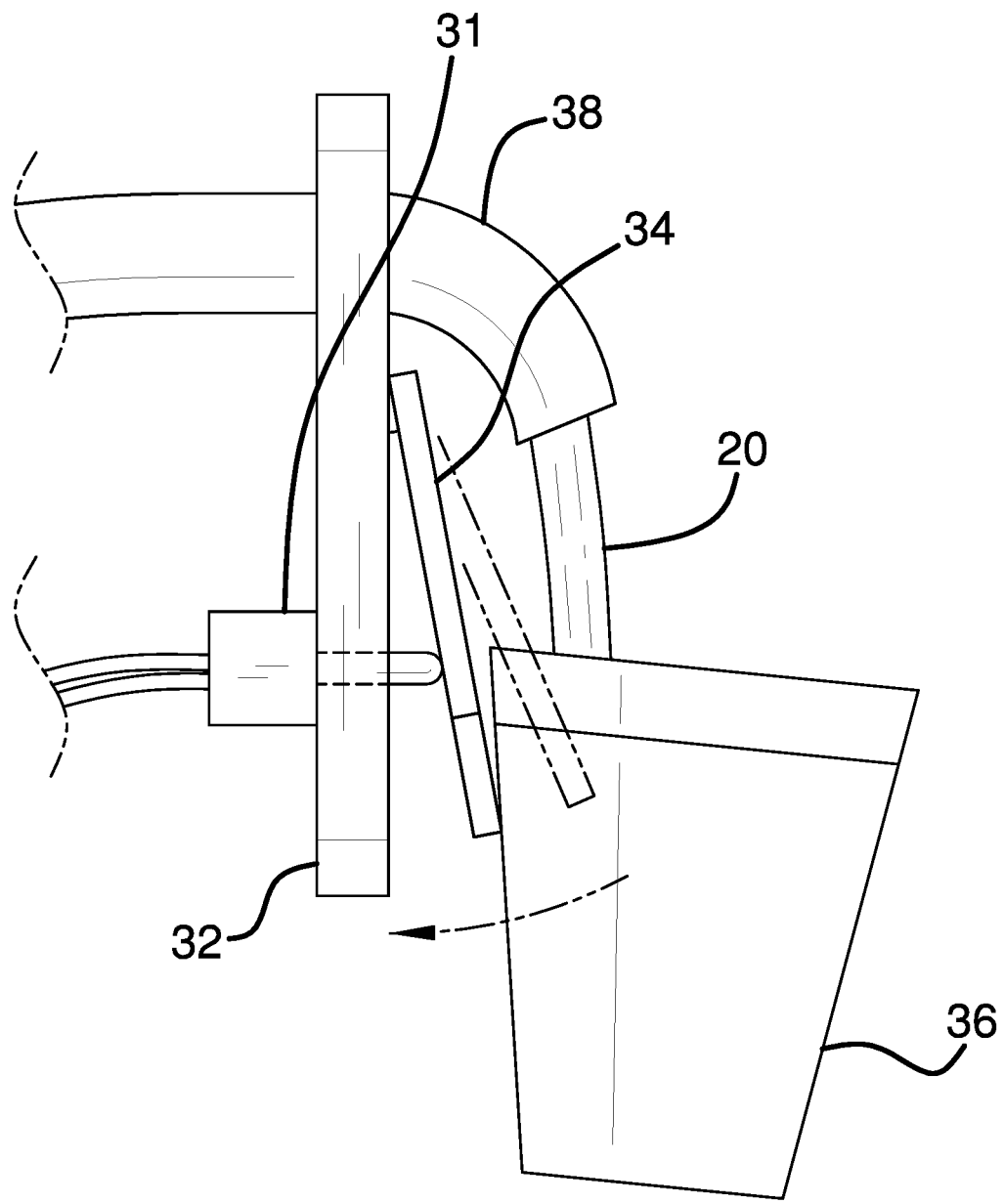
FIG. 4 is a perspective view of switch of an embodiment of the disclosure.

With reference now to the drawings, and in particular to FIGS. 1 through 4 thereof, a new dispensing device embodying the principles and concepts of an embodiment of the disclosure and generally designated by the reference numeral 10 will be described.

As best illustrated in FIGS. 1 through 4, the beverage dispensing system 10 generally comprises a vehicle 12 that has a cabin 14 and an outer surface 16. The vehicle 12 may be a passenger vehicle, a cargo vehicle and any other conventional design of vehicle. A refrigerator 18 is positioned within the vehicle 12 and the refrigerator 18 contains a beverage 20. The beverage 20 may be water and any other liquid beverage 20. The refrigerator 18 may be an electrical refrigerator or the like and the refrigerator cools the beverage 20. The refrigerator 18 has a fill spout 22 to fill the refrigerator 18 with the beverage 20 and a drain 24 to selectively drain 24 the fluid from the refrigerator 18.

A dispensing unit 26 is provided and the dispensing unit 26 is fluidly coupled to the refrigerator 18 to selectively dispense the beverage 20. The dispensing unit 26 is positioned within the cabin 14 to be accessible to a driver of the vehicle 12. The dispensing unit 26 comprises a pump 28 that is coupled to the refrigerator 18 and the pump 28 is in fluid communication with the interior of the refrigerator 18. The pump 28 selectively pumps the beverage 20 out of the refrigerator 18 and the pump 28 has an output 30. Moreover, the pump 28 may be an electric fluid pump 28 or the like.

A switch 31 is positioned within the cabin 14 and the switch 31 is selectively manipulated. The switch 31 is electrically coupled to the pump 28 such that the switch 31 turns the pump 28 on and off. Moreover, the switch 31 includes a panel 32 that is coupled to the vehicle 12 and a lever 34 that is hingedly coupled to the panel 32. A beverage container 36 is selectively positioned against the lever 34 thereby facilitating the lever 34 to be urged to engage the panel 32. The switch 31 is turned on when the lever 34 engages the panel 32. The lever 34 is biased to disengage the panel 32 and the switch 31 is turned off when the lever 34 disengages the panel 32. Additionally, the switch 31 may be positioned on a dashboard or other easily accessible location in the cabin 14.

A spout 38 is coupled to and extends away from the panel 32 and the beverage container 36 is selectively positioned beneath the spout 38. A conduit 40 is fluidly coupled between the output 30 on the pump 28 and the spout 38 to dispense the beverage 20 into the beverage container 36 when the beverage container 36 is manipulated to engage the lever 34. In this way the beverage container 36 is selectively filled with the beverage 20 for consumption.

A charging unit 42 is provided and the charging unit 42 is coupled to the vehicle 12 such that the charging unit 42 is exposed to sunlight. The charging unit 42 converts sunlight into electrical energy and the charging unit 42 is electrically coupled to the refrigerator 18 and the dispensing unit 26. The charging unit 42 comprises a solar panel 44 that is coupled to the outside surface of the vehicle 12 to expose the solar panel 44 to sunlight. At least one battery 46 is positioned within the vehicle 12 and the at least one battery 46 is electrically coupled to the solar panel 44 such that the solar panel 44 charges the at least one battery 46. Moreover, the at least one battery 46 is electrically coupled to the pump 28 and the refrigerator 18. A controller 48 is electrically coupled between the solar panel 44 and the at least one battery 46 such that the controller 48 controls charging the at least one battery 46. The controller 48 may be an electronic voltage regulator or the like.

In use, the refrigerator 18 is selectively filled with the beverage 20 and the beverage container 36 is selectively positioned beneath the spout 38. The beverage container 36 is manipulated to urge the lever 34 against the panel 32 and the pump 28 is turned on to pump 28 the beverage 20. In this way the beverage container 36 is selectively filled while the vehicle 12 is being driven. Thus, the beverage 20 is continuously available thereby reducing the need to stop for beverage 20s when the vehicle 12 is being driven a long distance. The beverage 20 is selectively drained from the refrigerator 18.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A beverage dispensing system being fitted into a vehicle, said system comprising:
   a vehicle having a cabin and an outer surface;
   a refrigerator being positioned within said vehicle, said refrigerator being configured to contain a beverage, said refrigerator being configured to cool the beverage; and
   a dispensing unit being fluidly coupled to said refrigerator wherein said dispensing unit is configured to selectively dispense the beverage, said dispensing unit being positioned within said cabin wherein said dispensing unit is configured to be accessible to a driver of said vehicle, said dispensing unit including a pump; and
   a charging unit being coupled to said vehicle wherein said charging unit is configured to be exposed to sunlight, said charging unit being configured to convert sunlight into electrical energy, said charging unit being electrically coupled to said refrigerator and said dispensing unit, said charging unit comprising a solar panel being coupled to said outside surface of said vehicle wherein said solar panel is configured to be exposed to sunlight.

2. The system according to claim 1, wherein said refrigerator has a fill spout being in fluid communication with an interior of said refrigerator wherein said fill spout is configured to fill the refrigerator with the beverage, said refrigerator having a drain being in fluid communication with said interior wherein said drain is configured to selectively drain the fluid from said refrigerator.

3. The system according to claim 2, wherein said dispensing unit comprises a pump being coupled to said refrigerator, said pump being in fluid communication with said interior of said refrigerator wherein said pump is configured to selectively pump the beverage, said pump having an output.

4. The system according to claim 3, further comprising a switch being positioned within said cabin wherein said switch is configured to be manipulated, said switch being electrically coupled to said pump such that said switch turns said pump on and off.

5. The system according to claim 4, wherein said switch includes a panel being coupled to said vehicle and a lever being hingedly coupled to said panel wherein said lever is configured to have a beverage container positioned thereagainst thereby facilitating said lever to be urged to engage said panel, said switch being turned on when said lever engages said panel, said lever being biased to disengage said panel, said switch being turned off when said lever disengages said panel.

6. The system according to claim 5, further comprising a spout being coupled to and extending away from said panel wherein said spout is configured to have the beverage container positioned therebeneath.

7. The system according to claim 6, further comprising a conduit being fluidly coupled between said output on said pump and said spout wherein said spout is configured to dispense the beverage into the beverage container when the beverage container is manipulated to engage said lever.

8. The system according to claim 1, wherein:
   said dispensing unit includes a pump; and
   said charging unit includes at least one battery being positioned within said vehicle, said at least one battery being electrically coupled to said solar panel such that said solar panel charges said at least one battery, said at least one battery being electrically coupled to said pump and said refrigerator.

9. The system according to claim 8, further comprising a controller being electrically coupled between said solar panel and said at least one battery such that said controller controls charging said at least one battery.

10. A beverage dispensing system being fitted into a vehicle, said system comprising:
    a vehicle having a cabin and an outer surface;
    a refrigerator being positioned within said vehicle, said refrigerator being configured to contain a beverage, said refrigerator being configured to cool the beverage, said refrigerator having a fill spout being in fluid communication with an interior of said refrigerator wherein said fill spout is configured to fill the refrigerator with the beverage, said refrigerator having a drain being in fluid communication with said interior wherein said drain is configured to selectively drain the fluid from said refrigerator;

a dispensing unit being fluidly coupled to said refrigerator wherein said dispensing unit is configured to selectively dispense the beverage, said dispensing unit being positioned within said cabin wherein said dispensing unit is configured to be accessible to a driver of said vehicle, said dispensing unit comprising:
  a pump being coupled to said refrigerator, said pump being in fluid communication with said interior of said refrigerator wherein said pump is configured to selectively pump the beverage, said pump having an output,
  a switch being positioned within said cabin wherein said switch is configured to be manipulated, said switch being electrically coupled to said pump such that said switch turns said pump on and off, said switch including a panel being coupled to said vehicle and a lever being hingedly coupled to said panel wherein said lever is configured to have a beverage container positioned thereagainst thereby facilitating said lever to be urged to engage said panel, said switch being turned on when said lever engages said panel, said lever being biased to disengage said panel, said switch being turned off when said lever disengages said panel,
  a spout being coupled to and extending away from said panel wherein said spout is configured to have the beverage container positioned therebeneath, and
  a conduit being fluidly coupled between said output on said pump and said spout wherein said spout is configured to dispense the beverage into the beverage container when the beverage container is manipulated to engage said lever; and a charging unit being coupled to said vehicle wherein said charging unit is configured to be exposed to sunlight, said charging unit being configured to convert sunlight into electrical energy, said charging unit being electrically coupled to said refrigerator and said dispensing unit, said charging unit comprising:
  a solar panel being coupled to said outside surface of said vehicle wherein said solar panel is configured to be exposed to sunlight,
  at least one battery being positioned within said vehicle, said at least one battery being electrically coupled to said solar panel such that said solar panel charges said at least one battery, said at least one battery being electrically coupled to said pump and said refrigerator, and
  a controller being electrically coupled between said solar panel and said at least one battery such that said controller controls charging said at least one battery.

* * * * *